United States Patent
Matsueda (10) Patent No.: US 7,256,907 B2
(45) Date of Patent: Aug. 14, 2007

(54) SERVER APPARATUS, JOB MANAGING METHOD, COMPUTER-READABLE MEMORY MEDIUM, AND PROGRAM

(75) Inventor: Kazutaka Matsueda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/331,475

(22) Filed: Dec. 31, 2002

(65) Prior Publication Data

US 2003/0133152 A1 Jul. 17, 2003

(30) Foreign Application Priority Data

Jan. 11, 2002 (JP) ............................. 2002-003981

(51) Int. Cl.
*G06F 15/00* (2006.01)
(52) U.S. Cl. ..................................... 358/1.15; 358/1.16
(58) Field of Classification Search ............... 358/1.15, 358/1.16; 711/100, 147, 150, 151, 153, 156, 711/157, 158, 159, 171
See application file for complete search history.

(56) References Cited

U.S. PATENT DOCUMENTS

| 5,727,135 A | * | 3/1998 | Webb et al. | ................ 358/1.14 |
| 5,873,659 A | * | 2/1999 | Edwards et al. | .............. 400/61 |
| 6,700,678 B1 | * | 3/2004 | Luman | ..................... 358/1.15 |
| 2002/0030850 A1 | | 3/2002 | Matsueda | .................. 358/1.15 |
| 2002/0186400 A1 | | 12/2002 | Matsueda | .................. 358/1.14 |
| 2003/0090705 A1 | * | 5/2003 | Ferlitsch | .................... 358/1.15 |

FOREIGN PATENT DOCUMENTS

| JP | 11-039119 | 2/1999 |
| JP | 11-112754 | 4/1999 |
| JP | 2000-235642 | 8/2000 |
| JP | 2001-075752 | 3/2001 |
| JP | 2001-86284 | 3/2001 |

OTHER PUBLICATIONS

Chapter 16—Adminstering Network Printers and Print Services□□http://www.microsoft.com/technet/prodtechnol/windows2000serv/support/c16w2kad.mspx.*

* cited by examiner

*Primary Examiner*—Kimberly A. Williams
(74) *Attorney, Agent, or Firm*—Fitzpatrick, Cella, Harper & Scinto (57) ABSTRACT

A specific memory box is temporarily formed every job which is requested by a client apparatus and the user of the client apparatus uniquely processes the job information at a high speed. In response to a print request from a client apparatus which can be connected to a network, a printer apparatus is instructed to form a memory box for managing the job information in a memory apparatus of the printer apparatus. When the job information whose printing has been requested by the client apparatus is inputted and registered into the formed memory box, the client apparatus is notified of printer management information of the job information inputted and registered in the memory box.

10 Claims, 9 Drawing Sheets

MEMORY MEDIUM SUCH AS
FD OR CD-ROM

| DIRECTORY INFORMATION |
|---|
| 1ST DATA PROCESSING PROGRAM<br>PROGRAM CODE GROUP CORRESPONDING TO STEPS OF THE FLOWCHART SHOWN IN FIG. 6 |
| 2ND DATA PROCESSING PROGRAM<br>PROGRAM CODE GROUP CORRESPONDING TO STEPS OF THE FLOWCHART SHOWN IN FIG. 7 |
| |

MEMORY MAP IN MEMORY MEDIUM

SERVER APPARATUS, JOB MANAGING METHOD, COMPUTER-READABLE MEMORY MEDIUM, AND PROGRAM

BACKGROUND OF THE INVENTION

1. Field of the Invention

The invention relates to a server apparatus which can communicate with a printer apparatus connected to a network, a job managing method, a computer-readable memory medium, and a program.

2. Related Background Art

Hitherto, a remote print system comprising client apparatuses such as a cellular phone and the like connected to a network, a server apparatus which receives print requests from clients and is connected to the network, and a printer apparatus connected to the network has been constructed in a manner such that if the print requests are issued from the clients, the requests are collected by the server apparatus and print data can be sequentially printed from the server apparatus by the printer.

The remote print system also has been constructed in a manner such that jobs are managed by the server apparatus, terminals such as a personal computer and the like are arranged near the printer, and when the user comes to receive printed matter, an obtaining request of the job is issued to the server apparatus from the personal computer near the printer, thereby enabling a desired print result to be obtained.

Further, the remote print system also has been constructed in a manner such that a fixed memory box is assured in, for example, a hard disk or the like provided for the printer and print data (job) from the user of each personal computer can be stored into the fixed memory box and managed.

There is, consequently, a problem such that when the print request is issued, the print data is promptly outputted from the server apparatus to the printer, so that the printed matter is taken away or read by the third party, secrecy is lost, or the like.

A method of holding the print data into the server apparatus has a problem such that although it is excellent in secrecy, it takes a time to print from the server apparatus to the printer, or the like.

Further, there is also a problem such that since the memory box has been fixedly formed in the apparatus, if a password or the like for job extraction is known to persons other than the client, secrecy is lost or the like.

There is also a problem such that when a remote printing function is added, a charging process for properly evaluating a use amount of the memory box provided for the printer apparatus and requesting a consideration is not performed, memory resources cannot be effectively used, or the like.

SUMMARY OF THE INVENTION

The invention is made to solve the above problems and it is an object of the invention to provide a server apparatus which can communicate with a printer apparatus connected to a network, wherein in response to a print request from a client apparatus which can be connected to the network, the printer apparatus is instructed to form a memory box for managing job information in a memory apparatus of the printer apparatus, when the job information whose printing is requested by the client apparatus is inputted and registered into the formed memory box, the client apparatus is notified of printer management information of the job information inputted and registered into the memory box, thereby temporarily forming a specific memory box every job which is requested by the client apparatus, and a job processing environment in which the user of the client apparatus can uniquely process the job information at a high speed can be freely constructed, and to provide a job managing method, a computer-readable memory medium, and a program for such a server apparatus.

Another object of the invention is to provide a server apparatus, a job managing method, a computer-readable memory medium, and a program, in which a situation such that a memory box temporarily formed in a printer apparatus is automatically deleted in accordance with a processing situation of registered job information, so that the memory box is occupied by the specific user is avoided, and it is flexibly cope with a job processing request from a client apparatus which can use a printer apparatus.

Further another object of the invention is to provide a server apparatus, a job managing method, a computer-readable memory medium, and a program, in which it is possible to freely construct a job processing environment having high usefulness which can establish a system for developing a remote print service by evaluating a use situation of a memory box which is formed in a printer apparatus every memory box, calculating a use amount, and executing a charging process.

According to a first aspect of the invention, there is provided a server apparatus which can communicate with a printer apparatus connected to a network, comprising: creation instructing means for instructing the printer apparatus to form a memory box for managing job information in a memory apparatus of the printer apparatus in response to a print request from a client apparatus which can be connected to the network; registering means for inputting and registering the job information whose printing has been requested by the client apparatus into the formed memory box; and notifying means for notifying the client apparatus of printer management information of the job information inputted and registered in the memory box.

According to a second aspect of the invention, the server apparatus further comprises: monitoring means for monitoring the job information inputted and registered in the memory box; and deletion instructing means for instructing the printer apparatus to delete the registered job information in accordance with a managing state of the job information which is monitored by the monitoring means.

According to a third aspect of the invention, the notifying means notifies the client apparatus of the inputted printer apparatus information and a memory box number.

According to a fourth aspect of the invention, the server apparatus further comprises forming means for forming authentication information for managing the job information, wherein the registering means allows the authentication information to be included in the job information whose printing has been requested by the client apparatus and inputs and registers those information into the memory box.

According to a fifth aspect of the invention, the server apparatus further comprises forming means for forming authentication information for managing the job information, wherein the notifying means notifies the client apparatus of registration management information including the authentication information formed by the forming means and a formed memory box number.

According to a sixth aspect of the invention, the server apparatus further comprises confirming means for confirming a forming situation of the memory box, wherein when it is confirmed by the confirming means that the memory box cannot be formed, the notifying means notifies the client apparatus of the fact that the job information cannot be printed.

According to a seventh aspect of the invention, the server apparatus further comprises searching means for searching whether a printer apparatus which can process the job information exists on the network or not when it is confirmed by the confirming means that the memory box cannot be formed, wherein when the printer apparatus which can form the memory box is searched by the searching means, the notifying means notifies the client apparatus of the printer management information including the box number of the memory box formed in the printer apparatus.

According to an eighth aspect of the invention, the server apparatus further comprises discriminating means for, when the print request from the client apparatus is received, discriminating whether the memory box for the same client apparatus has already been formed in the printer apparatus or not, wherein if it is determined by the discriminating means that the memory box for the same client apparatus has already been formed, the registering means inputs and registers the job information whose printing has been requested by the client apparatus into the formed same memory box.

According to a ninth aspect of the invention, the server apparatus further comprises: measuring means for measuring an occupation use time of the memory box formed in the printer apparatus; calculating means for calculating a charge for the memory box to be demanded to the client apparatus on the basis of the occupation use time which is measured by the measuring means; and charge processing means for executing a charging process to the memory box charge which is calculated by the calculating means.

According to a tenth aspect of the invention, the calculating means detects a size of memory which is used by the job information which is registered into the formed memory box and calculates the memory box charge to be demanded to the client apparatus in consideration of the detected memory size.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

An embodiment of the invention will be described in detail hereinbelow.

Figure 1:
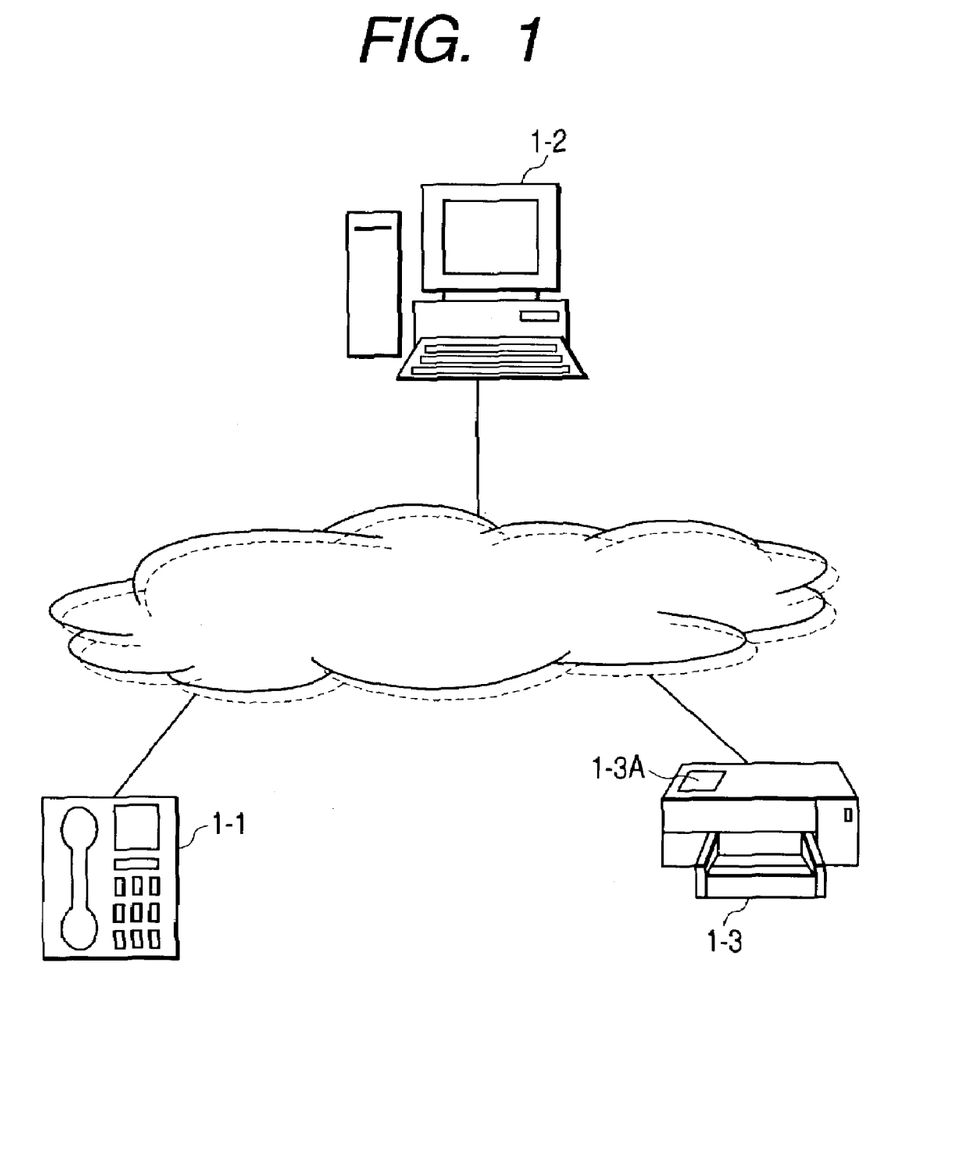
FIG. 1 is a schematic diagram for explaining a construction of a print system according to an embodiment of the invention.

FIG. 1 is a schematic diagram for explaining a construction of a print system according to an embodiment of the invention and corresponds to an example of a system in which a server apparatus, a client apparatus, and a printer apparatus can communicate with each other via a network.

In FIG. 1, reference numeral 1-1 denotes a client apparatus for printing. Any apparatus such as personal computer, portable telephone, cellular phone, or the like can be used so long as it can issue a print request.

Reference numeral 1-2 denotes a server apparatus which can receive the print requests from a plurality of clients and sequentially input print data to a printer apparatus 1-3. The apparatuses 1-1, 1-2, and 1-3 are connected via a network such as Internet, LAN, wireless LAN, telephone line, digital line, or the like.

In the embodiment, the client apparatus 1-1 issues the print request and the server apparatus 1-2 arbitrates the printing and prints into a memory box 1-3A.

Figure 2:
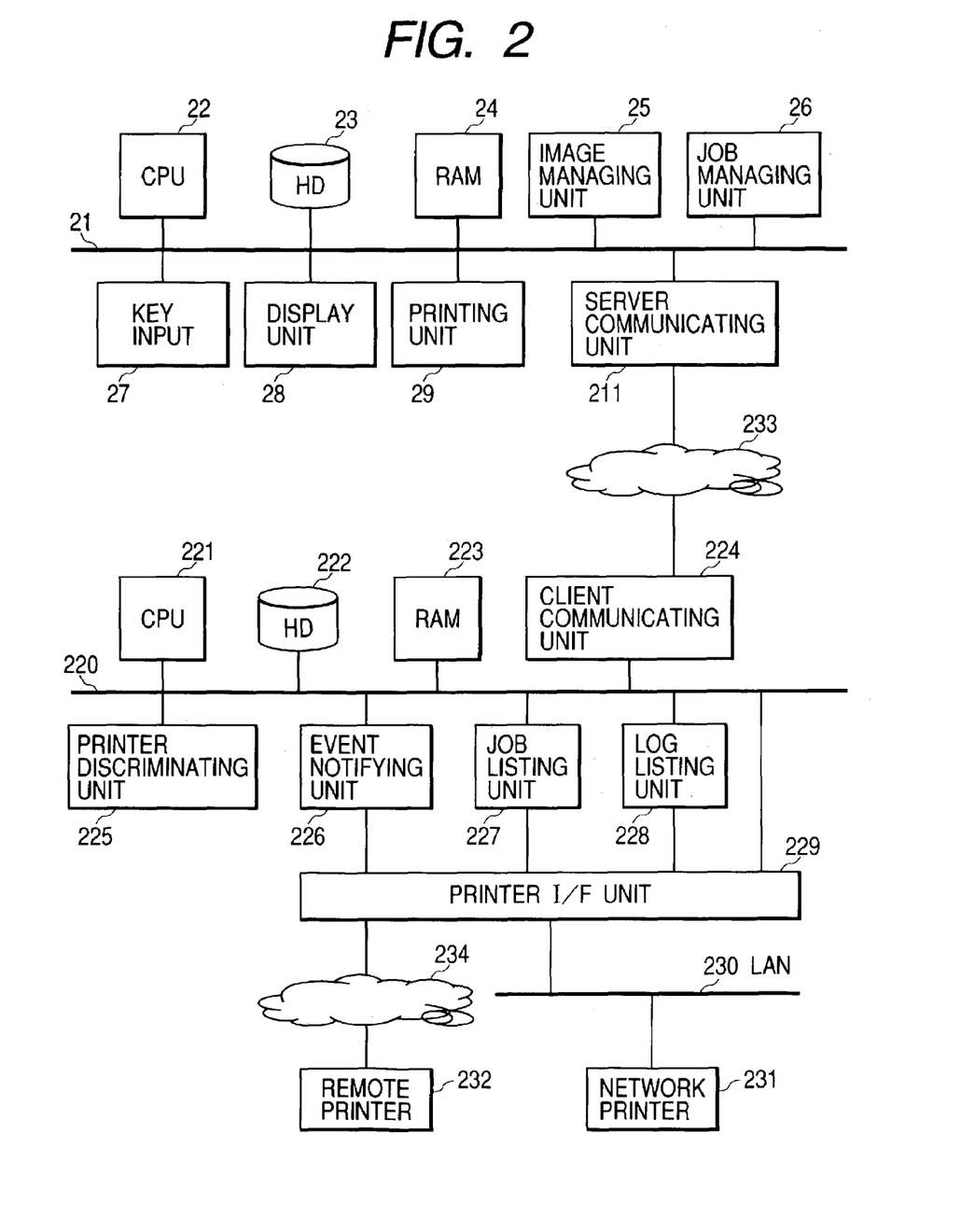
FIG. 2 is a block diagram for explaining the construction of the print system according to the embodiment of the invention.

FIG. 2 is a block diagram for explaining the construction of the print system according to the embodiment of the invention. In the example, it corresponds to the case where the print system comprises a client, a server, and a network printer.

In FIG. 2, the client apparatus 1-1, server apparatus 1-2, and printer apparatus 1-3 are connected via Webs 233 and 234.

In the client apparatus 1-1, reference numeral 21 denotes a system bus on the client side, 22 a CPU for controlling the system; and 23 a hard disk in which control codes to be executed by the CPU 22 have been written.

Reference numeral 24 denotes an RAM; 25 an image managing unit for managing a job inputted from a user application; 26 a job managing unit for managing information of a job; and 27 a key input unit of a personal computer or the like.

Reference numeral 28 denotes a display unit such as a display or the like; 29 a printing unit for processing the job by a print protocol such as IPP, LPR, or the like; and 211 a server communicating unit corresponding to a portion for communicating with the server apparatus 1-2 and executing a communicating process such as an HTTP or the like.

When a job is inputted from a user application in the same machine or an external personal computer, an image is stored into the image managing unit 25. The job managing unit 26 manages the job information by a queue such as an FIFO or the like.

In the server apparatus 1-2, reference numeral 220 denotes a system bus on the server side and 221 indicates a CPU for controlling the system of the server.

Reference numeral 222 denotes a hard disk in which various kinds of programs including a system program such as OS or the like, a printer driver, a communication driver, and the like, data, and the control codes which are executed by the CPU 221 have been stored.

Reference numeral 223 denotes an RAM; 224 a client communicating unit for communicating with the client apparatus 1-1; and 225 a printer discriminating unit for discriminating whether the job inputted from the client apparatus 1-1 to the printer apparatus 1-3 has normally been delivered from the printer apparatus 1-3 or not.

Reference numeral 226 denotes an event notifying unit for receiving an event notification from the printer apparatus 1-3, and 227 indicates a job listing unit for listing the jobs in the printer apparatus 1-3.

Reference numeral 228 denotes a log listing unit for referring to a print result log which is held in the printer apparatus 1-3, and 229 indicates a printer I/F unit for executing a process to set and analyze a protocol which has been predetermined between the printer apparatus 1-3 and the client apparatus 1-1.

Reference numeral 230 denotes an LAN, 231 a network printer, and 232 a remote printer which is connected by an interface of Web234.

In the print system constructed as mentioned above, the print system which received the print request from the user application of the client apparatus 1-1 holds the image and the job information into the image managing unit 25 and the job managing unit 26, respectively, and notifies the server apparatus 1-2 of the print request via the server communicating unit 211.

The server apparatus 1-2 which manages the printer apparatus 1-3 receives job processing requests from a plurality of client apparatuses and forms a memory box for a remote printer for printing.

If the memory box is successfully formed here, information such as box number, password, and the like necessary for extraction is sent to the client apparatus which issued the print request and receives the job from the client apparatus 1-1. The job received from the client apparatus 1-1 is inputted into the relevant memory box of the printer apparatus 1-3 as soon as the printer apparatus 1-3 becomes empty. The user stores the box number and the password notified from the server apparatus 1-2 and operates an operation panel of the remote printer 232, so that he can extract printed matter (job) from the relevant memory box of the printer apparatus 1-3.

Figure 3:
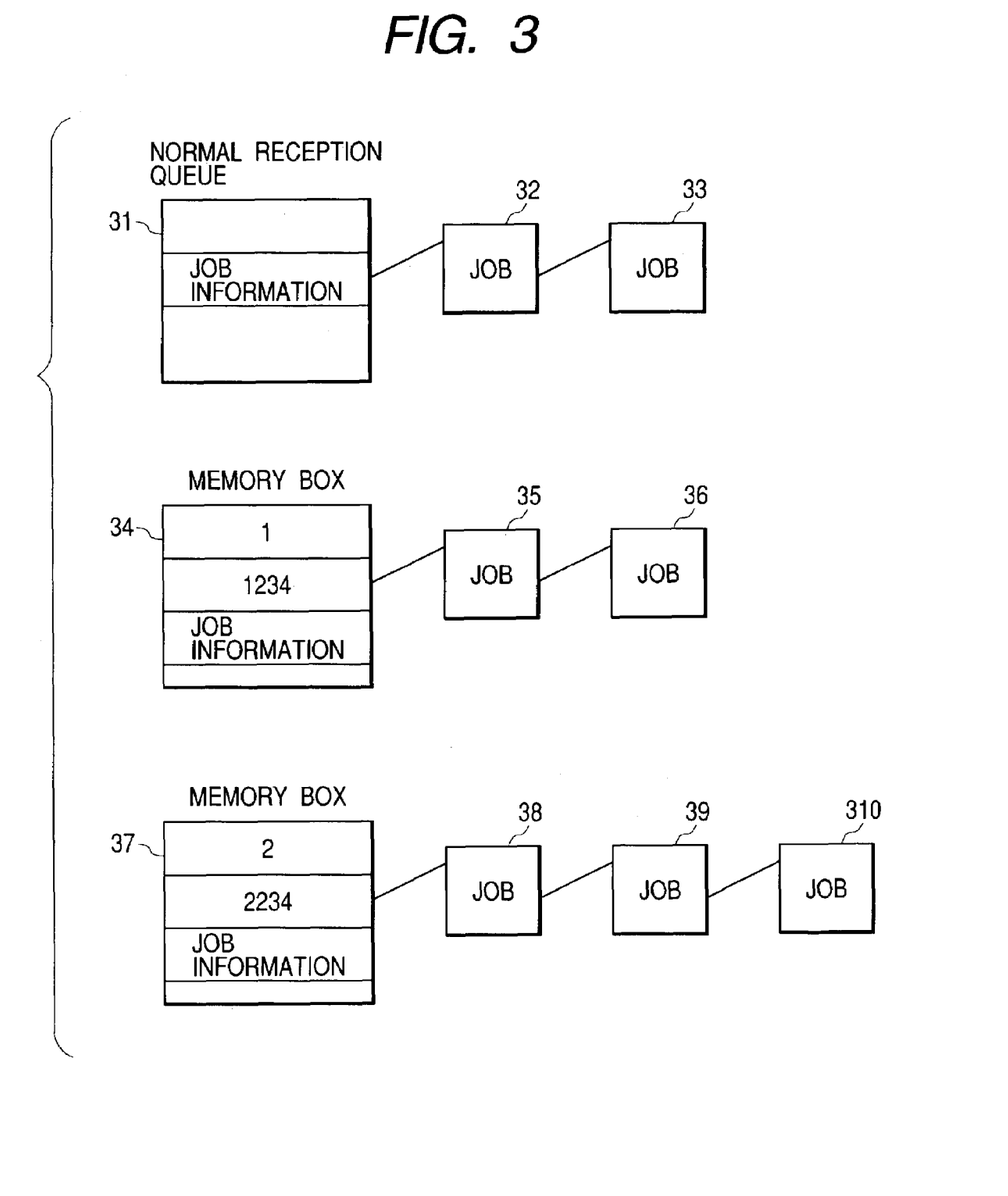
FIG. 3 is a diagram for explaining a construction of a reception queue and memory boxes in a printer apparatus shown in FIG. 1.

FIG. 3 is a diagram for explaining a construction of a reception queue and memory boxes in the printer apparatus 1-3 shown in FIG. 1.

In FIG. 3, reference numeral 31 denotes a normal reception queue. The normal reception queue 31 is used as an output of a job for immediately executing the print output because the memory box is not designated. It corresponds to a state where two jobs 32 and 33 are connected to the normal reception queue 31 at present.

Reference numerals 34 and 37 denote memory boxes. With respect to the memory box 34, a box number "1" and a password "1234" have been registered. The box number and the password can be registered when the box is formed or only the password can be formed after the box was formed. In case of unnecessity, the password is not formed.

The diagram corresponds to a state where jobs 35 and 36 are connected to the memory box 34 and managed at present.

Further, with respect to the memory box 37, a box number "2" and a password "2234" have been registered. The diagram corresponds to a state where jobs 38, 39, and 310 are connected to the memory box 37 and managed at present.

Figure 4:
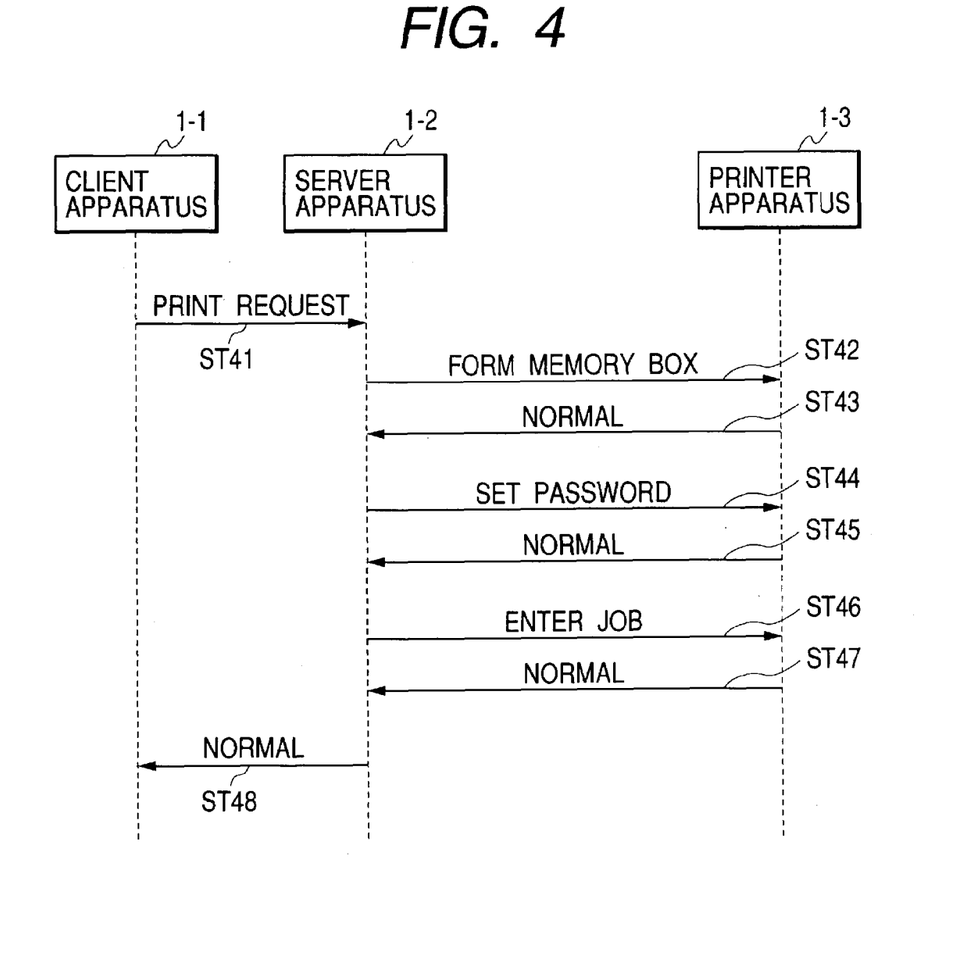
FIG. 4 is a diagram for explaining an example of a print processing sequence among three apparatuses including a client apparatus, a server apparatus, and a printer apparatus in the print system according to the invention.

FIG. 4 is a diagram for explaining an example of a print processing sequence among three apparatuses including the client apparatus, the server apparatus, and the printer apparatus in the print system according to the invention. The diagram corresponds to a remote printing process, particularly, a control flow in the normal state. ST41 to ST48 indicate processing steps.

In FIG. 4, in step ST41, the print request from the client apparatus 1-1, that is, information such as name of the printer for printing, job to print, client name, and the like in this request is sent to the printer apparatus 1-3.

In step ST42, the server apparatus 1-2 instructs the printer apparatus 1-3 to form a memory box therein. In step ST43, a reply that the memory box has normally been formed is returned to the server apparatus 1-2.

In step ST44, setting of a password into the memory box formed in the printer apparatus 1-3 is instructed in accordance with the instruction in step ST42. In step ST45, a reply that the password has normally been formed is sent from the printer apparatus 1-3 to the server apparatus 1-2.

In step ST46, the job sent in step ST43 is inputted to the printer apparatus 1-3. At this time, the server apparatus 1-2 transfers the job to the printer apparatus 1-3 by using an IPP (Internet Printing Protocol) or the like.

In step ST47, a reply that the job has normally been inputted is sent from the printer apparatus 1-3 to the server apparatus 1-2. In step ST48, the server apparatus 1-2 responds the printer name, the location of the printer, the memory box number, and if necessary, the password, and the like to the client apparatus 1-1.

Figure 5:
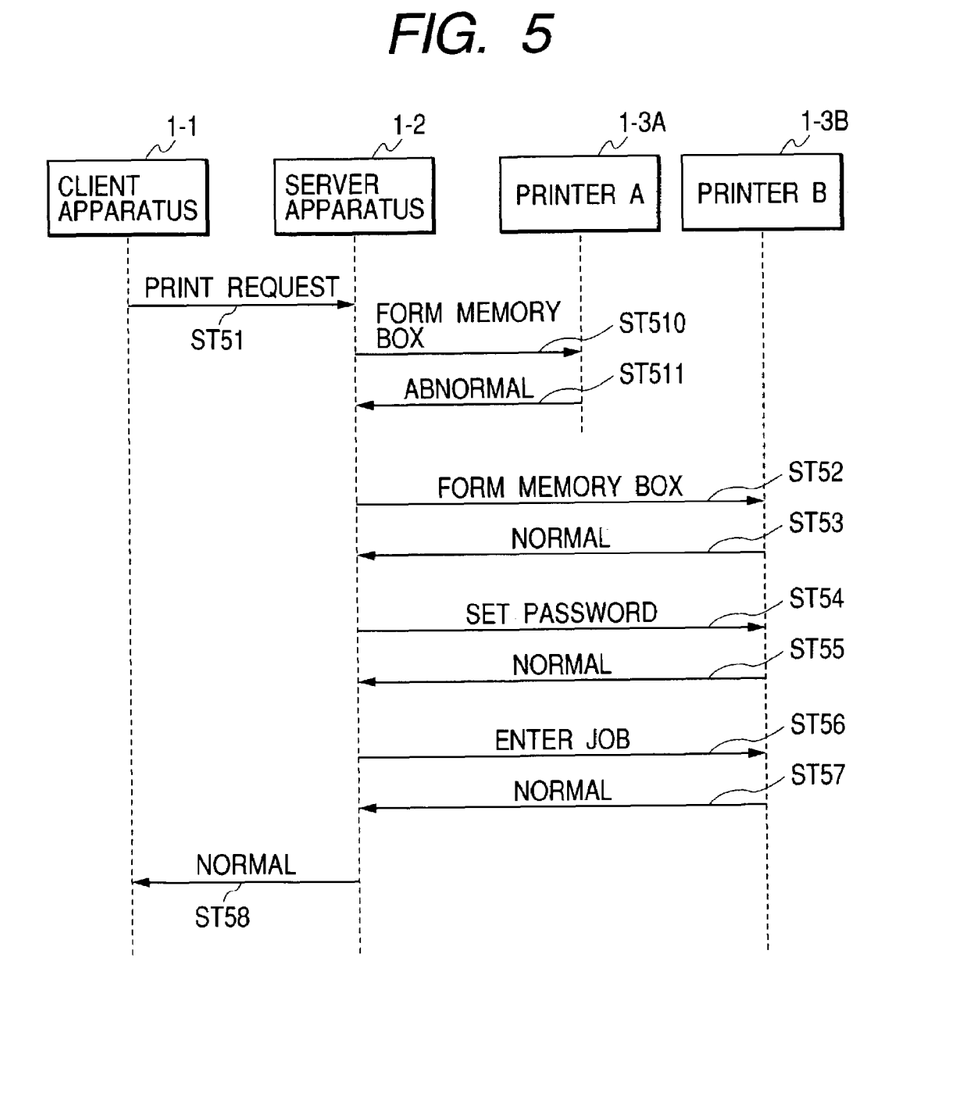
FIG. 5 is a diagram for explaining an example of a print processing sequence among three apparatuses including the client apparatus, the server apparatus, and the printer apparatus in the print system according to the invention.

FIG. 5 is a diagram for explaining an example of a print processing sequence among three apparatuses including the client apparatus, the server apparatus, and the printer apparatus in the print system according to the invention. The diagram corresponds to a remote printing process, particularly, a control flow upon switching of the printer. ST51, ST510, ST511, and ST52 to ST58 indicate processing steps. For convenience of explanation, the case where two printers 1-3A and 1-3B are connected via the network is presumed.

In FIG. 5, in step ST51, the print request from the client apparatus 1-1, that is, information such as name of the printer for printing, job to print, client name, and the like in this request is sent to the printer apparatus 1-3.

In step ST510, the server apparatus 1-2 requests the printer 1-3A to form a memory box therein. In step ST511, the printer 1-3A notifies the server apparatus 1-2 of the fact that the creation of the memory box has failed (abnormality).

It is now assumed that after the creation of the box into the printer 1-3A failed, the server apparatus 1-2 refers to a printer management table (not shown) in the server apparatus 1-2 and, thereafter, selects the optimum printer. In the example, it is assumed that the printer 1-3B is selected.

In step ST52, the printer 1-3B is instructed to form a memory box. In step ST53, a reply that the memory box has normally been formed is sent from the printer 1-3B to the server apparatus 1-2.

In step ST54, the server apparatus 1-2 instructs the printer 1-3B to set a password into the memory box. In step ST55, a reply that the password has normally been formed is sent from the printer 1-3B to the server apparatus 1-2.

In step ST56, the job sent in step ST51 is inputted to the printer 1-3B. The job is transferred to the printer 1-3B here.

In step ST57, a reply that the job has normally been inputted is sent from the printer 1-3B to the server apparatus 1-2. In step ST58, the server apparatus 1-2 transfers the printer name, the location of the printer, the memory box number, and if necessary, the password, and the like to the client apparatus 1-1.

Figure 6:
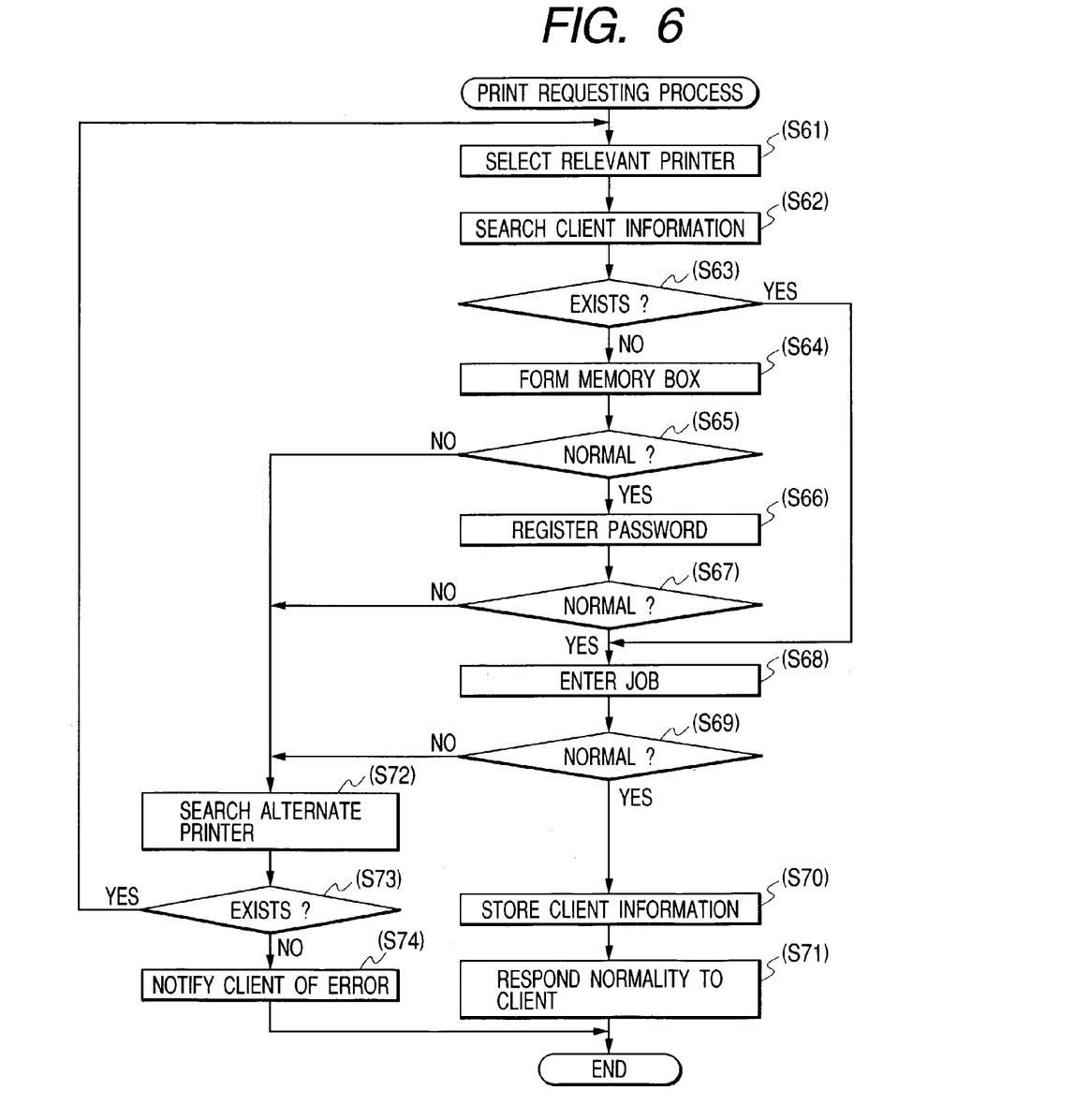
FIG. 6 is a flowchart showing an example of a first data processing procedure in the server apparatus according to the invention.

FIG. 6 is a flowchart showing an example of a first data processing procedure in the server apparatus according to the invention, and corresponds to a control procedure in the server at the time when the print request is received from the client in the remote print system. S61 to S74 denote processing steps.

First, in step S61, the printer apparatus instructed from the client apparatus 1-1 is selected. It is unnecessary that the printer name is instructed from the client apparatus 1-1 but can be also managed by the server apparatus 1-2 every kind of service for printing. The printer name can be also automatically selected in accordance with the name, address, or the like of the client apparatus.

Subsequently, in step S62, the client apparatus 1-1 which received the print request searches whether the job is not taken out but held in the memory box of the printer selected in step S61 or not.

In step S63, whether the job has been inputted in the memory box or not is discriminated. If it is determined that the job has been inputted in the memory box, step S68 follows and the job is inputted on the assumption that the memory box has already been formed.

If it is determined in step S63 that there is no job, step S64 follows and the memory box is formed.

In step S65, whether the memory box has normally been formed or not is discriminated. If it is determined that the memory box is not normally formed, step S72 follows and an alternative printer is searched.

If it is determined in step S65 that the memory box has normally been formed, step S66 follows and the password is set into the formed box and registered. In step S67, whether the setting of the password has normally been finished or not is discriminated. If it has normally been finished, that is, if it is determined that there is a normal reply from the printer apparatus as shown in step ST45 shown in FIG. 4, the job is inputted to the printer in step S68.

In step S69, whether the input of the job to the printer apparatus has normally been completed or not is discriminated. If it has normally been completed, that is, if it is determined that there is a normal reply from the printer apparatus as shown in step ST47 shown in FIG. 4, the information of the client apparatus which issued the print request is stored into an area held on the hard disk 222 in step S70.

In step S71, a normal reply showing that the data has normally been transferred to the printer apparatus 1-3 is sent to the client apparatus 1-1. The processing routine is finished.

If it is determined in step S69 that the input of the job to the printer apparatus is not normally completed (for example, the input of the job is not normally executed due to a reason such that the memory in the printer is busy or the like), that is, in the case where the printing to the printer apparatus selected in step S61 is not normally executed, an alternate printer is searched with reference to the foregoing table.

In step S73, whether the alternate printer apparatus could be detected or not is discriminated. If it is determined that the alternate printer could be detected, the processing routine is returned to step S61. If it is determined that the alternate printer cannot be detected, in step S74, the client apparatus 1-1 is notified of an error message showing that the printing could not be performed. The processing routine is finished.

Figure 7:
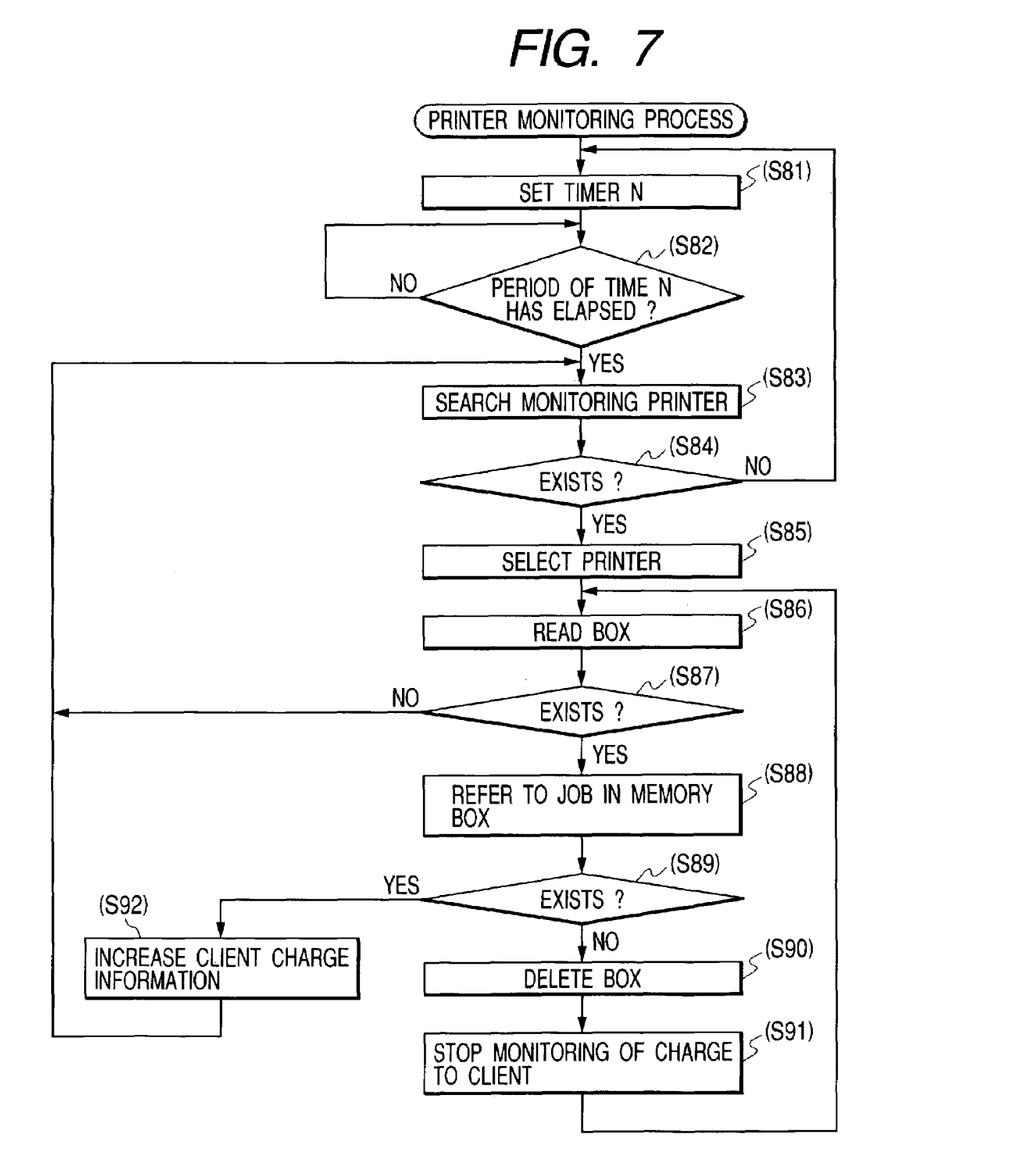
FIG. 7 is a flowchart showing an example of a second data processing procedure in the server apparatus according to the invention.

FIG. 7 is a flowchart showing an example of a second data processing procedure in the server apparatus according to the invention and corresponds to a charge management control procedure for each client in the remote print system. S81 to S92 denote processing steps.

The server apparatus 1-2 monitors the printer apparatus 1-3 at a predetermined period N and, in this processing routine, it is assumed that it counts the predetermined period N by a timer.

First, in step S81, the timer (not shown) is set so as to be activated at the predetermined period N. In step S82, whether the designated time N has elapsed or not is discriminated. If it is determined that the designated time N has elapsed, step S83 follows and a printer to be monitored is searched.

Figure 8:
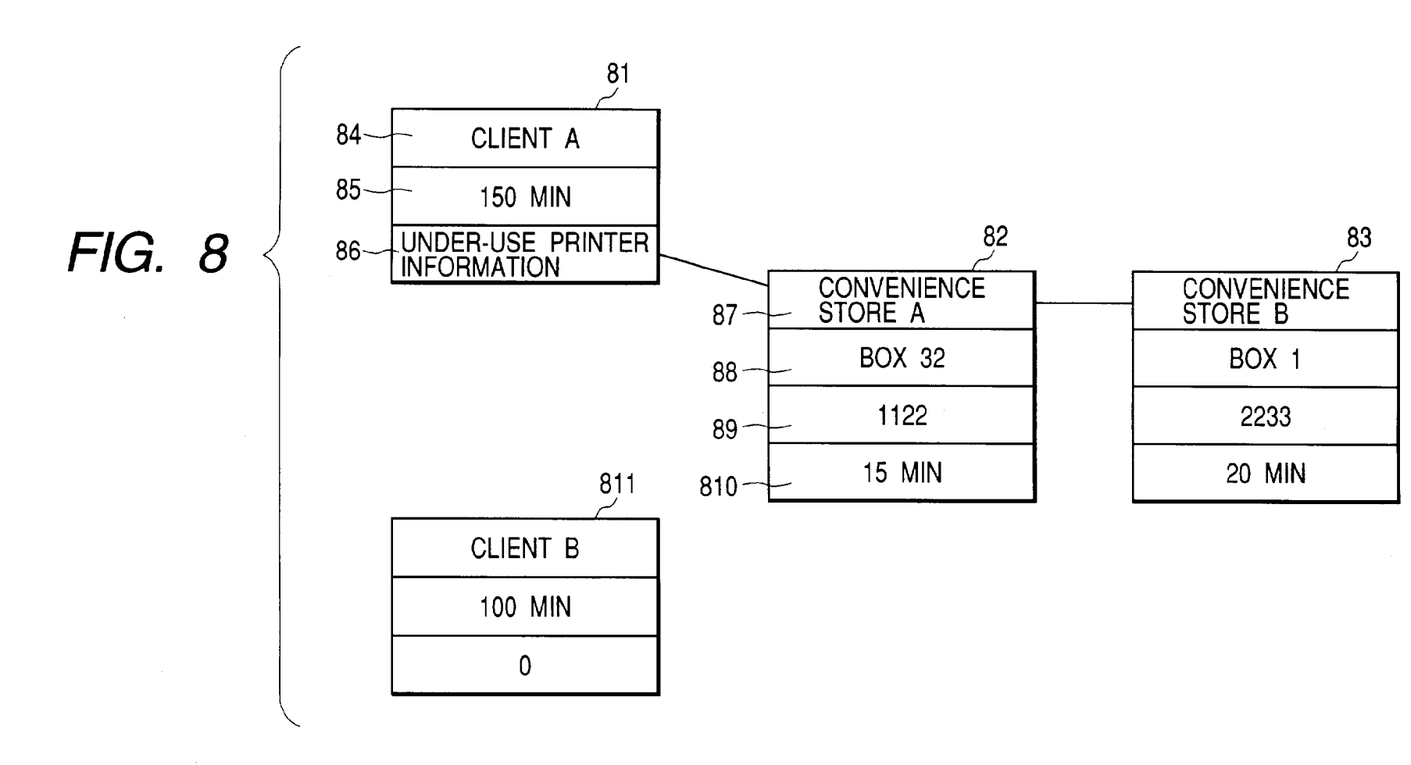
FIG. 8 is a diagram for explaining a memory structure for charge management in the server apparatus shown in FIG. 2.

Specifically speaking, the printer which is being used is searched from a memory management structure table as shown in FIG. 8.

FIG. 8 is a diagram for explaining a memory structure for charge management in the server apparatus 1-2 shown in FIG. 2.

In FIG. 8, reference numeral 81 denotes a charge management table of the client "A", 84 a client name in which the name of the client and the name of the user are inputted, and 85 a total use time. The total use time 85 indicates the time during which the memory box is occupied. If the job is held in the memory box of the printer, the total use time 85 is counted up more. In the example, it indicates 150 minutes.

Such a time indicates the time during which the memory box has been used until now. In the case of using the memory boxes of a plurality of printers, the time is counted up by the time corresponding to the number of printers. This time is reset to "0" when the charge is settled and indicates the use time from the settlement to the present time.

Specifically speaking, information 810 is added to the total use time 85 at timing when printers 82 and 83 are eliminated from under-use printer information 86. That is, charge information of the memory box which is being used at present is not included in the total use time 85.

An amount of money to be paid by the user is calculated on the basis of the value of the total use time 85 and a charge unit (not shown). For example, if the memory box is rented at 10 yen per minute, the money amount until the present time is equal to 1500 yen.

The under-use printer information 86 indicates the information of the printer which is being used by the client A and shows a state where the information of the printers 82 and 83 are connected at present.

With respect to the printer 82, a name "convenience store A" has been allocated as a printer name 87. Reference numeral 88 denotes a number of the box which is being used and "32" is used at present as a box number.

Reference numeral 89 denotes a password allocated to the box number "32" and, for example, "1122" is used as a value of the password. Reference numeral 810 denotes the box use time and indicates that the information is not taken out of the box for 15 minutes but is held.

Similarly, with respect to the printer 83, a memory box "1" of a convenience store B is used, a password "2233" is used, and a use time is equal to 20 minutes.

In the present system, a memory structure similar to that of the charge management table 81 is provided every user of the client. The charge management table 811 is a charge management table of the client B. The client B shows that the memory box which is being used at present does not exist but the memory box is being used for 100 minutes until the present time.

If it is determined in step S84 that the printer to be monitored does not exist, the processing routine is returned to step S81 and the timer is activated again. For example, in the case of the client B or the like, since there is no printer to be monitored, the processing routine is returned to step S81.

If it is determined in step S84 that the printer to be monitored exists, the printer information of the printer 82 or the like is selected in step S85. In step S86, the number of the box formed by the box No. 88 is read out.

In step S87, the presence or absence of the box number is discriminated. If it is determined that there is no box number, for example, if the memory box printing is not executed, since both of the box No. 88 and the password 89 are not set, the processing routine is returned from step S87 to step S83.

If it is determined in step S87 that the box number exists, in step S88, the printer is inquired about whether printed matter exists in the box number or not by using a communication command with reference to the job in the memory box.

The presence or absence of the job in the memory box is discriminated in step S89. If it is determined that the job exists, step S92 follows and the value corresponding to the timer N is added to the box use time 810 as client charge information. The processing routine is returned to step S83.

If it is determined in step S89 that the job does not exist in the memory box, the memory box is deleted (specifically speaking, a process for removing the box information of the printers 82 and 83 or the like from the under-use printer information 86) in step S90. The charge management of the client is stopped in step S91. The processing routine is returned to step S86.

According to the embodiment as mentioned above, if it is determined that there is no job in the memory box, the memory box is deleted, thereby enabling the memory resources in the device to be efficiently used. By combining the memory box management with the charge management, the charge management system can be easily constructed.

Although the charging method according to the use time has been shown in the embodiment, the charge can be made on the basis of a memory occupation amount of the printed matter. It is sufficient that the total of the jobs whose printing has been instructed is disclosed in place of the total use time 85. Use of both of the memory occupation amount and the box use time can be also easily realized.

A construction of a data processing program which can be read out by the print system to which the server apparatus according to the invention can be applied will be described hereinbelow with reference to a memory map shown in FIG. 9.

Figure 9:
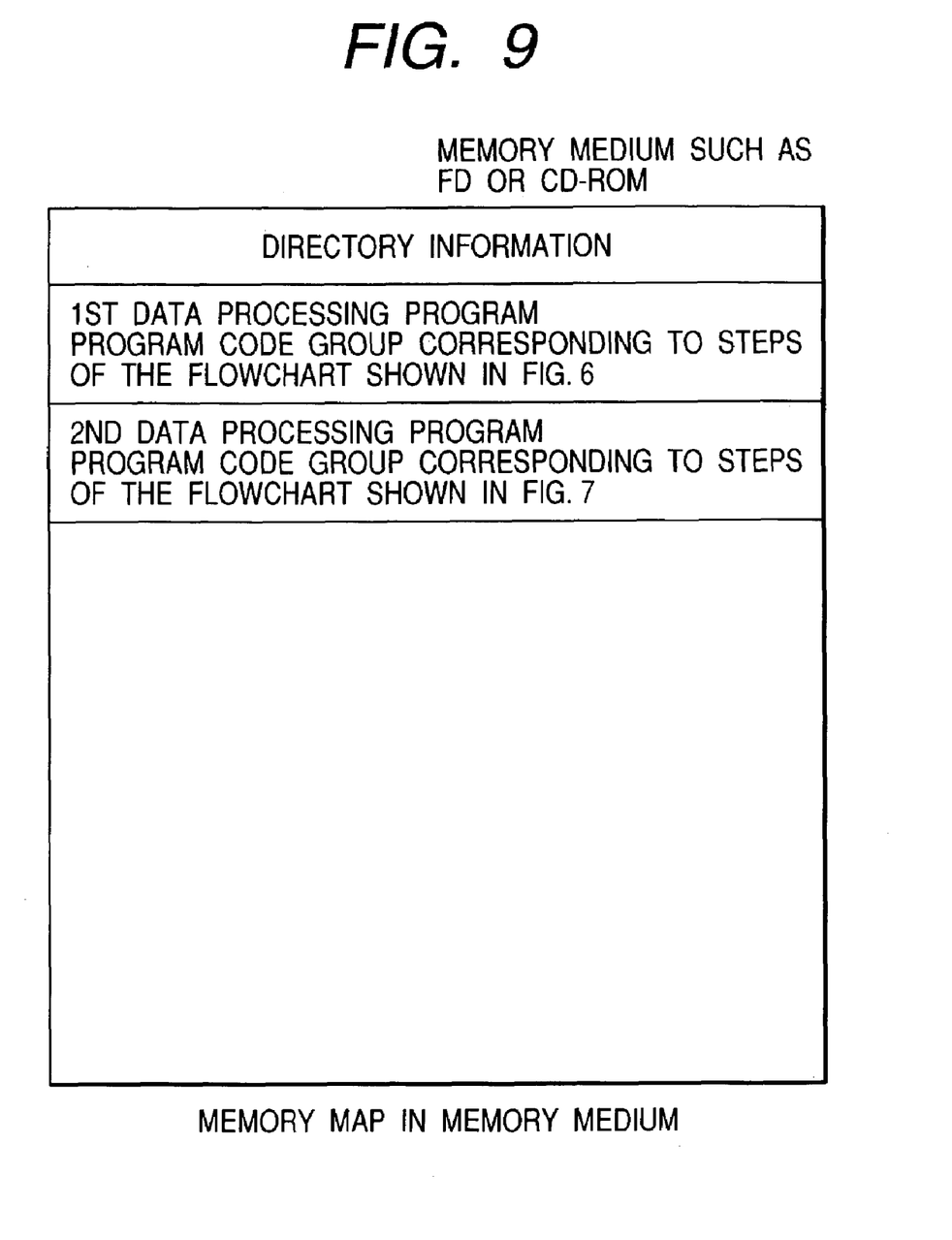
FIG. 9 is a diagram for explaining a memory map in a memory medium for storing various data processing programs which can be read out by the print system to which the server apparatus according to the invention can be applied.

FIG. 9 is a diagram for explaining a memory map in a memory medium for storing various data processing programs which can be read out by the print system to which the server apparatus according to the invention can be applied.

Although not particularly shown, information to manage a group of programs which are stored in the memory medium, for example, version information, implementor, and the like are also stored. There is also a case where information which depends on the OS or the like on the program reading side, for example, icons to identify and display the programs and the like are also stored.

Further, data belonging to the various programs is also managed in the directory. There is also a case where a program to install various programs into a computer or, if the program to install has been compressed, a program to decompress it, and the like are stored.

The functions shown in FIGS. 6 and 7 in the embodiment can be also executed by a host computer in accordance with a program that is installed from the outside. In this case, the invention is also applied to a case where an information group containing the program is supplied to an output apparatus from a memory medium such as CD-ROM, flash memory, FD, or the like or from an external memory medium via the network.

As mentioned above, naturally, the objects of the invention are accomplished by a method whereby a memory medium in which program codes of software for realizing the functions of the embodiments mentioned above have been recorded is supplied to a system or an apparatus and a computer (or a CPU or an MPU) of the system or the apparatus reads out and executes the program codes stored in the memory medium.

In this case, the program codes themselves read out from the memory medium realize the novel functions of the invention and the memory medium in which the program codes have been stored constructs the invention.

As a memory medium for supplying the program codes, for example, a floppy (registered trademark) disk, a hard disk, an optical disk, a magnetooptic disk, a CD-ROM, a CD-R, a magnetic tape, a non-volatile memory card, an ROM, an EEPROM, or the like can be used.

Naturally, the invention incorporates not only a case where the computer executes the read-out program codes, so that the functions of the embodiments mentioned above are realized but also a case where the OS (Operating System) or the like which is operating on the computer executes a part or all of actual processes on the basis of instructions of the program codes, and the functions of the embodiments mentioned above are realized by those processes.

Further, naturally, the invention incorporates a case where the program codes read out from the memory medium are written into a memory equipped for a function expanding board inserted into a computer or a function expanding unit connected to a computer and, thereafter, a CPU or the like provided for the function expanding board or the function expanding unit executes a part or all of actual processes on the basis of instructions of the program codes, and the functions of the embodiments mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, according to the 1st to 22nd invention of the present invention, in the server apparatus which can communicate with the printer apparatus connected to the network, in response to the print request from the client apparatus which can be connected to the network, the printer apparatus is instructed to form the memory box for managing the job information in the memory apparatus of the printer apparatus, when the job information whose printing has been requested by the client apparatus is inputted and registered into the formed memory box, the client apparatus is notified of the printer management information of the job information inputted and registered into the memory box, thereby temporarily forming the specific memory box every job which is requested by the client apparatus, and the job processing environment in which the user of the client apparatus can uniquely process the job information at a high speed can be freely constructed.

Since the memory box temporarily formed in the printer apparatus is automatically deleted in accordance with the processing situation of the registered job information, a situation such that the memory box is occupied by the specific user can be avoided. It is possible to flexibly cope with the job processing requests from the client apparatuses which can use the printer apparatus.

Further, since the use situation of the memory box formed in the printer apparatus is evaluated every memory box, the use amount is calculated, and the charging process is executed, effects such that the job processing environment having high usefulness which can establish the system for developing the remote print service can be freely constructed, and the like are obtained.

What is claimed is:

1. A server apparatus which can communicate with a printer apparatus connected to a network, comprising:
   an instructing unit adapted to instruct the printer apparatus to form a memory box for managing job information in a memory apparatus of the printer apparatus in response to a print request from a client apparatus which can be connected to the network;
   a registering unit adapted to register the job information based on the print request from the client apparatus into the memory box formed in accordance with an instruction given by said instructing unit;
   a setting unit adapted to set authentication information into the formed memory box; and
   a notifying unit adapted to notify the client apparatus of information specifying the memory box in which the job information is registered by said registering unit and the authentication information set into the memory box by said setting unit,
   wherein the memory box is a memory area for registering the job information, and the job information registered in the memory box is extracted and printed in response to an instruction different from the print request.

2. An apparatus according to claim 1, further comprising:
   a monitoring unit adapted to monitor the job information registered in the memory box; and
   a deletion instructing unit adapted to instruct means for instructing the printer apparatus to delete the registered job information in accordance with a managing state of the job information monitored by said monitoring unit.

3. An apparatus according to claim 1, further comprising a confirming unit adapted to confirm a forming situation of the memory box, wherein, when it is confirmed by said confirming unit that the memory box cannot be formed, said notifying unit notifies the client apparatus of the fact that the job information cannot be printed.

4. An apparatus according to claim 3, wherein said calculating unit detects a size of memory used by the job information registered into the formed memory box and calculates the memory box charge to be demanded to the client apparatus in consideration of the detected memory size.

5. An apparatus according to claim 1, further comprising a searching unit adapted to search whether a printer apparatus which can process the job information exists on the network or not when it is confirmed by said confirming unit that the memory box cannot be formed, wherein, when the printer apparatus which can form the memory box is searched by said searching unit, said notifying unit notifies the client apparatus of the printer management information including the box number of the memory box formed in the printer apparatus.

6. An apparatus according to claim 1, further comprising a discriminating unit adapted to, when the print request from the client apparatus is received, discriminate whether the memory box for the same client apparatus has already been formed in the printer apparatus or not, wherein, if it is determined by said discriminating unit that the memory box for the same client apparatus has already been formed, said registering unit registers the job information based on the print request from the client apparatus into the formed memory box.

7. A method according to claim 6, wherein, if it is determined that the memory box for the client apparatus has already been formed in the printer apparatus, when the print request from the client apparatus is received, said registering step registers the job information for the print request from the client apparatus into the formed memory box.

8. An apparatus according to claim 1, further comprising:
   a measuring unit adapted to measure an occupation use time of the memory box formed in the printer apparatus;
   a calculating unit adapted to calculate a charge for the memory box to be demanded to the client apparatus on the basis of the occupation use time measured by said measuring unit; and
   a charge processing unit adapted to execute a charging process to the memory box charge calculated by said calculating unit.

9. A job managing method in a server apparatus which can communicate with a printer apparatus connected to a network, comprising:
   instructing the printer apparatus to form a memory box for managing job information in a memory apparatus of the printer apparatus in response to a print request from a client apparatus which can be connected to the network;
   registering the job information based on the print request from the client apparatus into the memory box formed in accordance with the print request from the client apparatus;
   setting authentication information into the formed memory box; and
   notifying the client apparatus of information specifying the memory box in which the job information is registered and the authentication information set into the memory box,
   wherein the memory box is a memory area for registering the job information, and the job information registered in the memory box is extracted and printed in response to an instruction different from the print request.

10. A computer-readable storage medium storing a computer-executable program for communicating with a printer apparatus connected to a network, comprising:
    instructing the printer apparatus to form a memory box for managing job information in a memory apparatus of the printer apparatus in response to a print request from a client apparatus which can be connected to the network;
    registering the job information based on the print request from the client apparatus into the memory box formed in accordance with the print request from the client apparatus;
    setting authentication information into the formed memory box; and
    notifying the client apparatus of information specifying the memory box in which the job information is registered and the authentication information set into the memory box,
    wherein the memory box is a memory area for registering the job information, and the job information registered in the memory box is extracted and printed in response to an instruction different from the print request.

* * * * *

UNITED STATES PATENT AND TRADEMARK OFFICE
CERTIFICATE OF CORRECTION

| | |
|---|---|
| PATENT NO. | : 7,256,907 B2 |
| APPLICATION NO. | : 10/331475 |
| DATED | : August 14, 2007 |
| INVENTOR(S) | : Matsueda |

It is certified that error appears in the above-identified patent and that said Letters Patent is hereby corrected as shown below:

COLUMN 1:
Line 40, "into" should read -- in --; and
Line 50, "use" should read -- used --.

COLUMN 2:
Line 1, "every" should read -- for every --;
Line 14, "is" (1st occurrence) should be deleted;
Line 15, "cope" should read -- coped --;
Line 17, "further" should read -- Further, --;
Line 24, "use" should read -- used --; and
Line 55, "those" should read -- that --.

COLUMN 3:
Line 15, "for, when" should read -- for when --.

COLUMN 5:
Line 4, "an" should be deleted;
Line 20, "an" should be deleted; and
Line 26, "into" should read -- in --.

COLUMN 6:
Line 31, "responds" should read -- responds with --.

COLUMN 8:
Line 34, "use" should read -- used --.

COLUMN 10:
Line 20, "an" should read -- a --;
Line 45, "the 1st to 22nd inven-" should be deleted; and
Line 46, "tion of" should be deleted.

UNITED STATES PATENT AND TRADEMARK OFFICE
CERTIFICATE OF CORRECTION

PATENT NO. : 7,256,907 B2
APPLICATION NO. : 10/331475
DATED : August 14, 2007
INVENTOR(S) : Matsueda It is certified that error appears in the above-identified patent and that said Letters Patent is hereby corrected as shown below:

COLUMN 11:
Line 40, "wherein," should read -- (new paragraph) ¶ wherein, --;
Line 63, "discriminate" should read -- discriminates --; and
Line 65, "wherein," should read -- (new paragraph) ¶ wherein, --.

Signed and Sealed this

Sixth Day of May, 2008

JON W. DUDAS
*Director of the United States Patent and Trademark Office*